(12) United States Patent
Hatjasalo et al.

(10) Patent No.: US 6,773,126 B1
(45) Date of Patent: Aug. 10, 2004

(54) LIGHT PANEL WITH IMPROVED DIFFRACTION

(75) Inventors: Leo Hatjasalo, Helsinki (FI); Kari Rinko, Helsinki (FI)

(73) Assignee: Oy Modilis Ltd., Helsinki (FI)

( * ) Notice: Subject to any disclaimer, the term of this patent is extended or adjusted under 35 U.S.C. 154(b) by 0 days.

(21) Appl. No.: 09/979,944

(22) PCT Filed: May 19, 2000

(86) PCT No.: PCT/FI00/00451

§ 371 (c)(1),
(2), (4) Date: Nov. 27, 2001

(87) PCT Pub. No.: WO00/74026

PCT Pub. Date: Dec. 7, 2000

(30) Foreign Application Priority Data

May 28, 1999 (FI) .................................................. 991216

(51) Int. Cl.[7] .................................................. F21V 7/04
(52) U.S. Cl. .......................... 362/31; 362/336; 362/337
(58) Field of Search .......................... 362/31, 30, 555, 362/231, 330, 336, 337, 26, 27

(56) References Cited

U.S. PATENT DOCUMENTS

| 5,105,568 A |   | 4/1992  | Branning          |         |
|-------------|---|---------|-------------------|---------|
| 5,122,890 A |   | 6/1992  | Makow             |         |
| 5,299,109 A |   | 3/1994  | Grondal           |         |
| 5,428,912 A |   | 7/1995  | Grondal et al.    |         |
| 5,481,440 A |   | 1/1996  | Oldham et al.     |         |
| 5,506,929 A | * | 4/1996  | Tai et al. ....................  | 385/146 |
| 5,542,201 A |   | 8/1996  | Grondal et al.    |         |
| 5,703,667 A |   | 12/1997 | Ochiai            |         |
| 5,742,433 A |   | 4/1998  | Shiono et al. ............... | 359/575 |
| 5,748,106 A |   | 5/1998  | Schoenian et al.  |         |
| 5,761,540 A |   | 6/1998  | White             |         |
| 5,892,599 A |   | 4/1999  | Bahuguna          |         |
| 6,011,602 A |   | 1/2000  | Miyashita et al. ............ | 349/65 |
| 6,036,328 A | * | 3/2000  | Ohtsuki et al. ............... | 362/31 |
| 6,144,480 A | * | 11/2000 | Li et al. ..................... | 359/279 |
| 6,151,166 A |   | 11/2000 | Matsushita et al. |         |
| 6,196,691 B1 | * | 3/2001 | Ochiai ......................... | 349/62 |
| 6,199,995 B1 | * | 3/2001 | Umemoto et al. ............ | 362/26 |
| 6,247,826 B1 | * | 6/2001 | Funamoto et al. ............ | 349/63 |
| 6,396,409 B1 |   | 5/2002 | Yeh               |         |

FOREIGN PATENT DOCUMENTS

| EP | 1016817 | 7/2000 |
|----|---------|--------|
| FI | 1533    | 6/1994 |
| FI | 98768   | 4/1997 |
| FI | 992732  | 6/2000 |
| FI | 982825  | 1/2001 |
| WO | 03/004931 | 1/2003 |

* cited by examiner

Primary Examiner—Thomas M. Sember
Assistant Examiner—Hargobind S. Sawhney
(74) Attorney, Agent, or Firm—Swidler Berlin Shereff Friedman, LLP (57) ABSTRACT

A light panel that includes a light source and a panel element operatively connected to the light source. The panel element includes a substantially transparent light transmitting material and is operative as a waveguide panel inside which light beams received from the light source propagate with total reflection. A diffractive outcoupling system is arranged on the panel element over a light surface of the panel element and is operative to outcouple the light beams from inside the panel element. The diffractive outcoupling system includes a plurality of local grating elements. The local grating elements have a plurality configurations and are optimized such that a diffraction efficiency is a function of location.

24 Claims, 10 Drawing Sheets

LIGHT PANEL WITH IMPROVED DIFFRACTION

FIELD OF THE INVENTION

The present invention relates to a light panel, comprising a light source and a panel element, said panel element being manufactured from a substantially transparent material for transmitting light thereby. The panel element is configured as a waveguide panel, inside which the light beams propagate with total reflection and get outcoupled therefrom with a diffractive outcoupling system.

BACKGROUND OF THE INVENTION

Diffractive structures refer in optics to all fine structures of a surface, which condition the passage of light on the basis of the diffraction effect. Thus, the details of fine structures must be in the same order of magnitude as the wavelength of light, even smaller than that. Most prior known microprismatic structures are not even diffractive structures as conditioning the passage of a beam therein is based on the refraction effect. On the other hand, the hologram is not a grating, whereas the grid does not produce a three-dimensional image or light. The local grid, in turn, refers to a local grating unit, such as e.g. a pixel. Furthermore, the entire grating structure may be constituted by a great variety of miscellaneous grating units.

It is prior known to outfit e.g. illuminators and indicator panels in exit ways with conventional incandescent lamps or fluorescent tubes. One such example can be found e.g. in Finnish utility model No. 1533. The cited solution comprises a light panel fitted with an illuminator cover, wherein the light of a fluorescent illuminator tube fitted inside the illuminator cover is directed out by way of the perimeter of a panel element mounted in connection with a light source. In this particular solution, the illuminator cover is provided with an elongated, cover-length opening for replacing the fluorescent illuminator tube therethrough from above. However, a drawback with this type of traditional indicator panels is the short service life of incandescent lamps and fluorescent tubes as the exit lights must be switched on all the time.

On the other hand, especially for the illumination of mobile phone displays, it is prior knowledge to use diffractive structures for the light outcoupling from waveguides. Refractive microprismatic or the like structures have also been developed for this purpose. However, a weakness with these are bright lines produced by the edges of prisms, which are difficult to eliminate in order to provide uniform lighting. Neither are the outcoupling capacities of prism structures equal to those of grating structures. In reference to actual diffractive solutions, one notable example is U.S. Pat. No. 5,703,667, which discloses a display lighting for use as a waveguide. The waveguide comprises a transparent panel, having its bottom surface provided with a diffractive grating structure for re-directing light that has been delivered in at the perimeter of the panel. The grating structure is designed in such a way that the surface area of a grating structure present in a unit area has a variable ratio to the gratingless surface area present therein. Thus, the grating is not plotted all over the waveguide. In this solution, it is possible to equalize the intensity of light outcoupling by making less grating structure close to a light source than far away from the light source. Subsequently, especially with large-size panels, the result is likely to be that the grating area will be so sparse that it begins to show in the outcoupling, whereby the uniformity is lost. The cited invention is also limited to planar structures which always re-direct light from the rear surface. The weakness of all prior known structures is more or less non-uniform lighting, a planar structure, a non-optimally designed grating pattern, and a very poor incoupling capacity.

SUMMARY OF THE INVENTION

The light panel of this invention has an object of providing a decisive improvement over the above problems and, in doing so, to raise essentially the available state of the art. In order to achieve this objective, a light panel of the invention is principally characterized in that an outcoupling system, such as a grating structure or the like, is arranged on the entire panel element all over its light surface, such that divergent recesses and/or grooves of various sizes and/or shapes are used to constitute divergent local gratings of various sizes and/or shapes, such as multi-shaped and/or binary pixels and/or units, having the filling factor, shape, profile and/or size thereof optimized in such a way that the diffraction efficiency is a function of place.

The most important benefits gained by a light panel of the invention include its simplicity, efficiency, and reliability in operation, since, in this conjunction, it is first of all possible to make use of very low-power leds as a light source. On the other hand, by virtue of a total-reflection based waveguide panel construction utilized in the invention, the light source can be optimized in all aspects since it is possible to minimize unintentional reflection losses and other light losses. By virtue of a principle exploited in the invention, it is further possible to make extremely thin structures, which can be embedded in a substrate, or else to manufacture flexible or preformed structures by providing every time such conditions that the limit or threshold angle of total reflection is not exceeded in the panel element. The invention makes it further possible to design the panel element for example as a box-type structure, such as a quadratic or tubular "lamp post". In addition, it is also possible to operate a light panel of the invention in such a way that it is activable in one or more sections for different colours, e.g. by using one or more variable-colour or multicolour LEDS, or e.g. by changing the intensity/operating voltage of a light source, etc.

BRIEF DESCRIPTION OF THE DRAWINGS

The invention will be described in more detail in the following specification with reference made to the accompanying drawings, in which.

DETAILED DESCRIPTION OF THE INVENTION

The invention relates to a light panel, comprising a light source 1 and a panel element 2, said panel element being manufactured from a substantially transparent material for transmitting light thereby. The panel element 2 is configured as a waveguide panel, wherein light beams propagate with total reflection and get outcoupled therefrom by means of a diffractive outcoupling system. An outcoupling system 2u, such as a grid structure or the like, is arranged on the entire panel element 2 all over its light surface 2a such that divergent recesses and/or grooves of various sizes and/or shapes are used to constitute divergent local gratings of various sizes and/or shapes (e.g. type A/B), such as multi-shaped and/or binary pixels and/or units, having the filling factor, shape, profile and/or size thereof optimized in such a way that the diffraction efficiency is a function of place. The above principle is perceivable from FIGS. 1a–1c.

Naturally, it is possible to adapt the size, shape, filling factor and/or the profile/structure of a local grating or a grating unit in various sections of a grating structure to be variable in terms of length-wise, lateral and/or vertical directions.

Figure 1A:
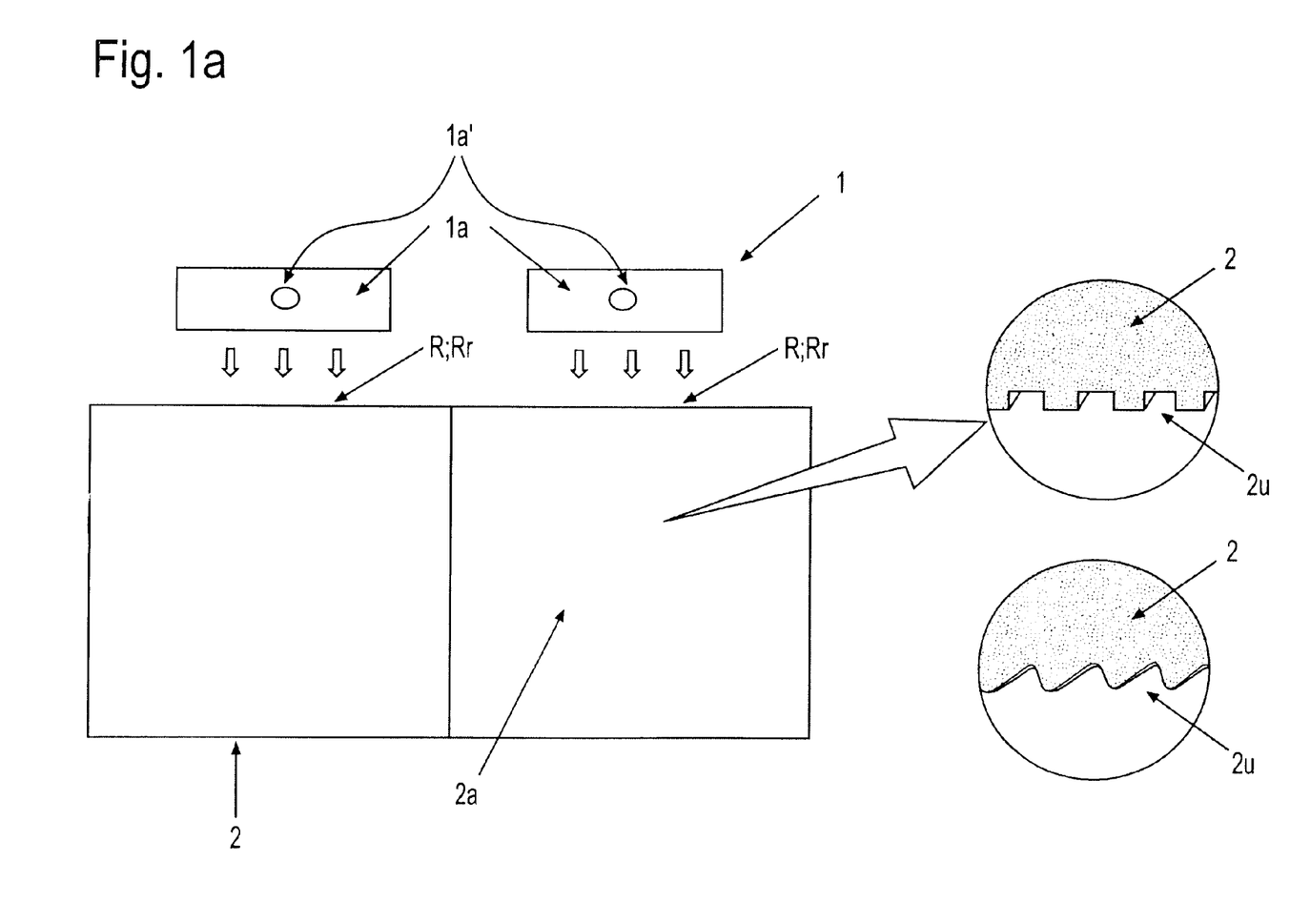
FIGS. 1a and 1b show an operating principle for one preferred light panel of the invention.
Figure 1B:
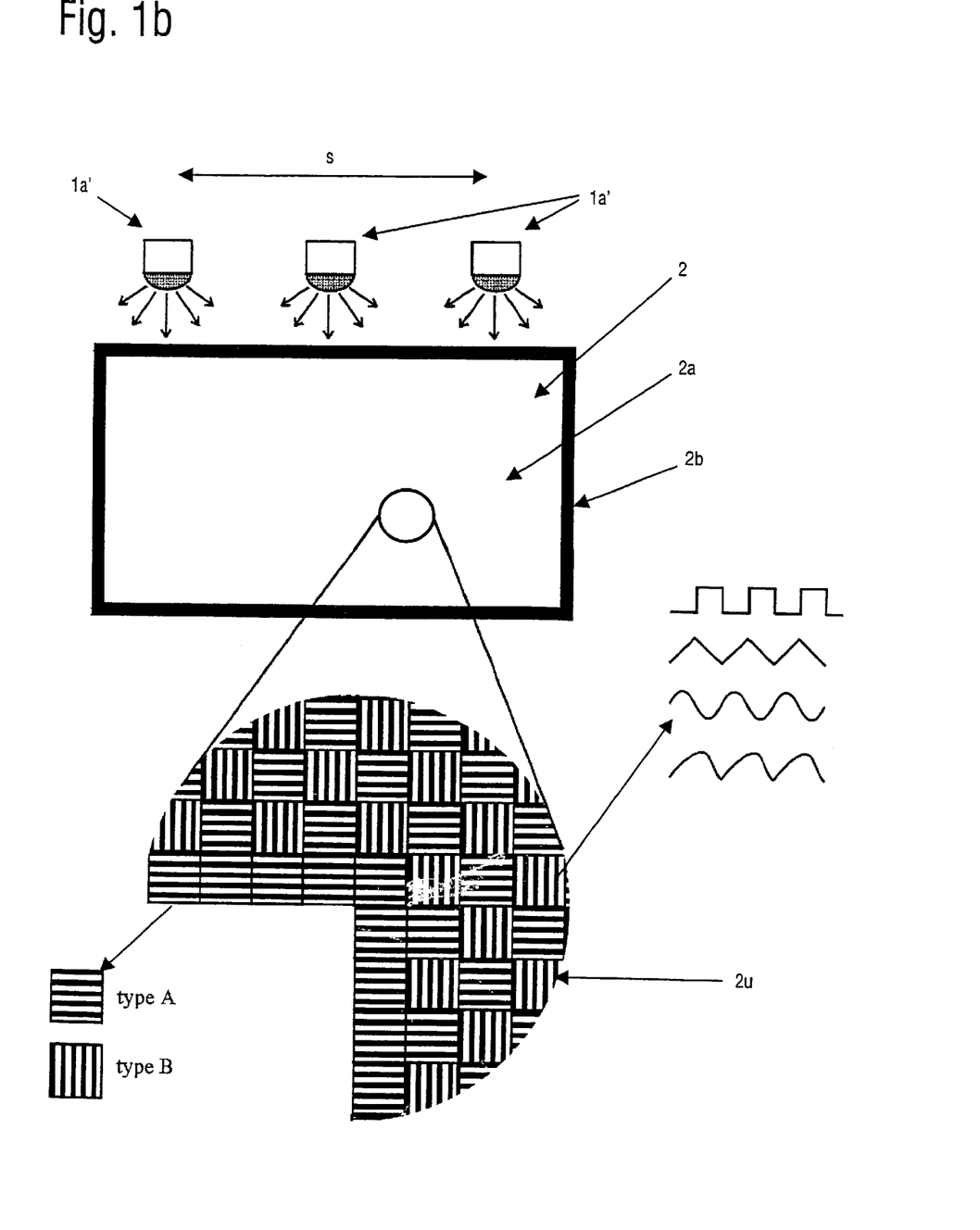

Furthermore, in reference to what is shown in FIGS. 1a and 1b, the light source 1 is provided with one (FIG. 1a) or more (FIG. 1b) LEDs 1a' successive in length-wise direction s for activating the single- (FIG. 1b) or multi-section (FIG. 1a) light surface 2a of the panel element 2 with light delivered therein. In the embodiments depicted in FIGS. 1b and 7, the light surface 2a is circumscribed by a passive perimeter element 2b. The light in coupling into the panel element 2 is arranged, as shown e.g. in FIG. 6b, by means of a diffractive incoupling system 2s present at its boundary surface R; Rr, such as a binary beam distributor, a local grating structure, a diffuser and/or the like, and/or, as shown e.g. in FIG. 6a, by means of geometric contours of the boundary surface R.

Figure 1C:
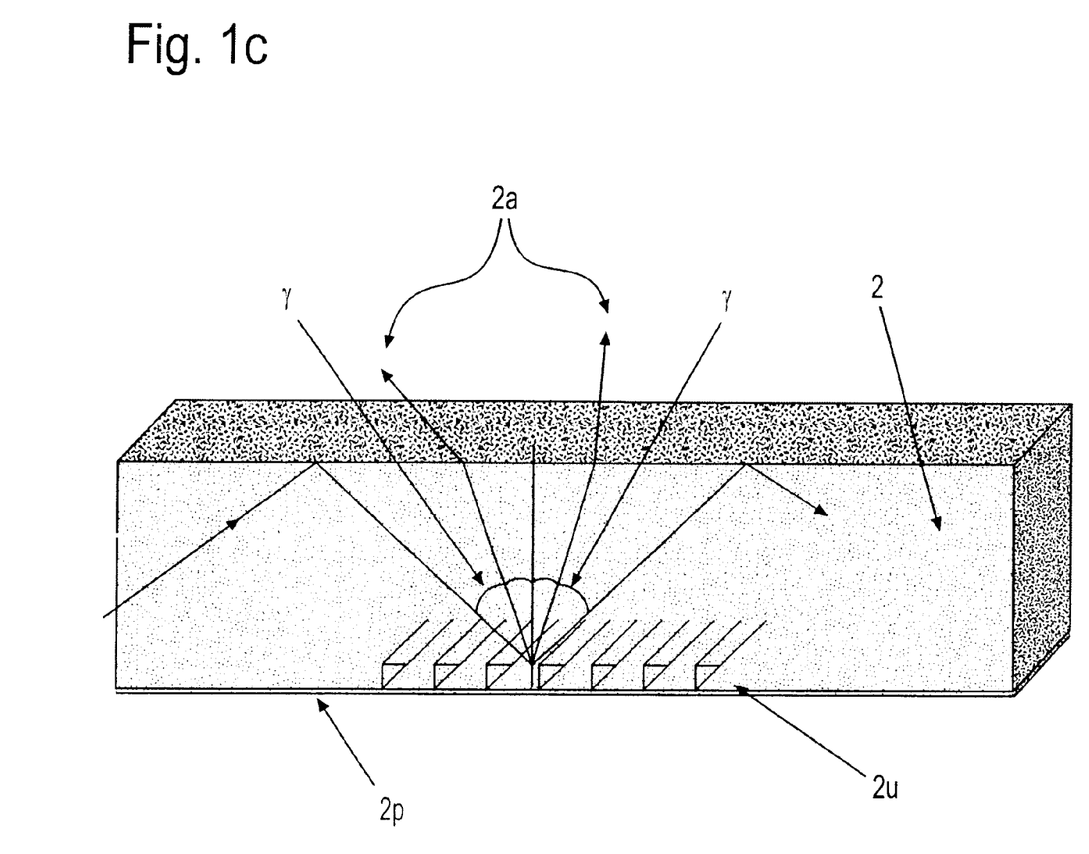
FIG. 1c illustrates further how to activate in principle the light surface of a light panel of the invention.

In the embodiment shown in FIG. 1c, a diffractive outcoupling system 2u, such as a local grating structure or the like, for a panel element 2 functioning as a waveguide panel is arranged on a bottom surface 2p of the panel element 2. Of course, it is also possible to arrange such a system on the panel element's top surface, which nevertheless requires in practice some sort of protective layer or coating for its mechanical protection.

Figure 6A:
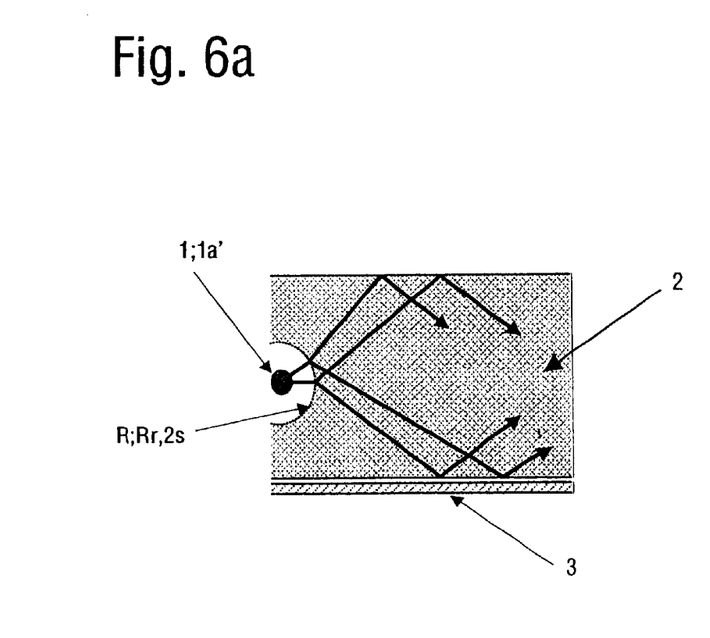
Figure 6B:
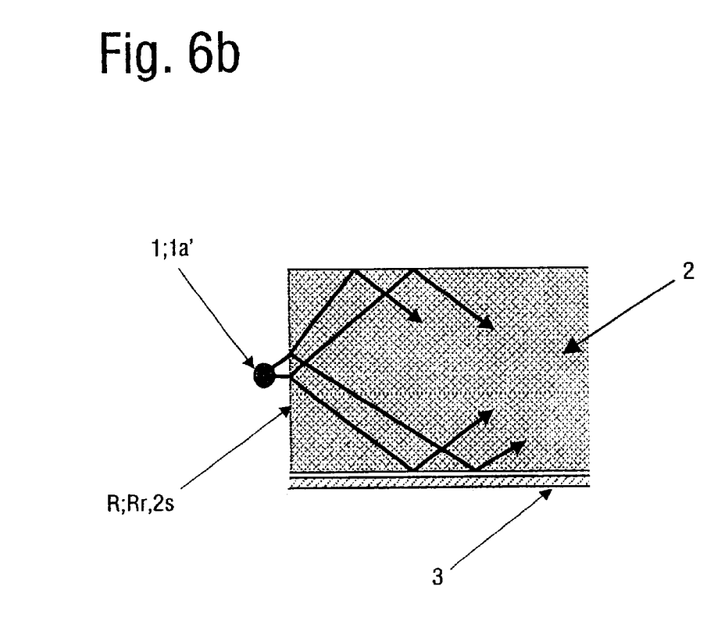

In a further preferred embodiment, the panel element 2 is manufactured from a thin and optically transparent manufacturing material, having a thickness of e.g. 0.1–4 mm, such a polymeric, elastomeric, ceramic material panel, sheet or the like, the incoupling system 2s being still preferably arranged at its perimeter Rr, as shown e.g. in FIGS. 6a and 6b.

In a further preferred embodiment, the panel element 2 is manufactured from a flexible or preformed manufacturing material, the panel element 2 having its light surface 2a adapted to activate by maintaining its local radius of curvature sufficiently small everywhere, such that the threshold angle of total reflection shall not be exceeded as the light beam travels within the panel element 2.

In a further preferred embodiment, the diffractive outcoupling system 2u activating an illuminated light panel is set up in such a way that the panel element 2 can be provided with a different colour over one or more sections. First of all, this is possible to implement in such a way that the light surface 2a of the light panel 2 activates to a different colour by providing one or more independently controllable lighting units 1; la with light means producing a different colour light, such a red/green/blue/white led 1a' or the like. On the other hand, it is also possible to achieve this by changing the intensity, supply voltage and/or the like of a light source or its integral elements.

In further reference to the embodiment shown e.g. in FIG. 1b, the panel element 2 is provided with a responsive surface 3, such as a reflector, a diffuser and/or the like, particularly for eliminating beams transmitted from a grating structure or the like of the outcoupling system 2u and/or for preventing the formation of pronounced light spots.

Figure 7:
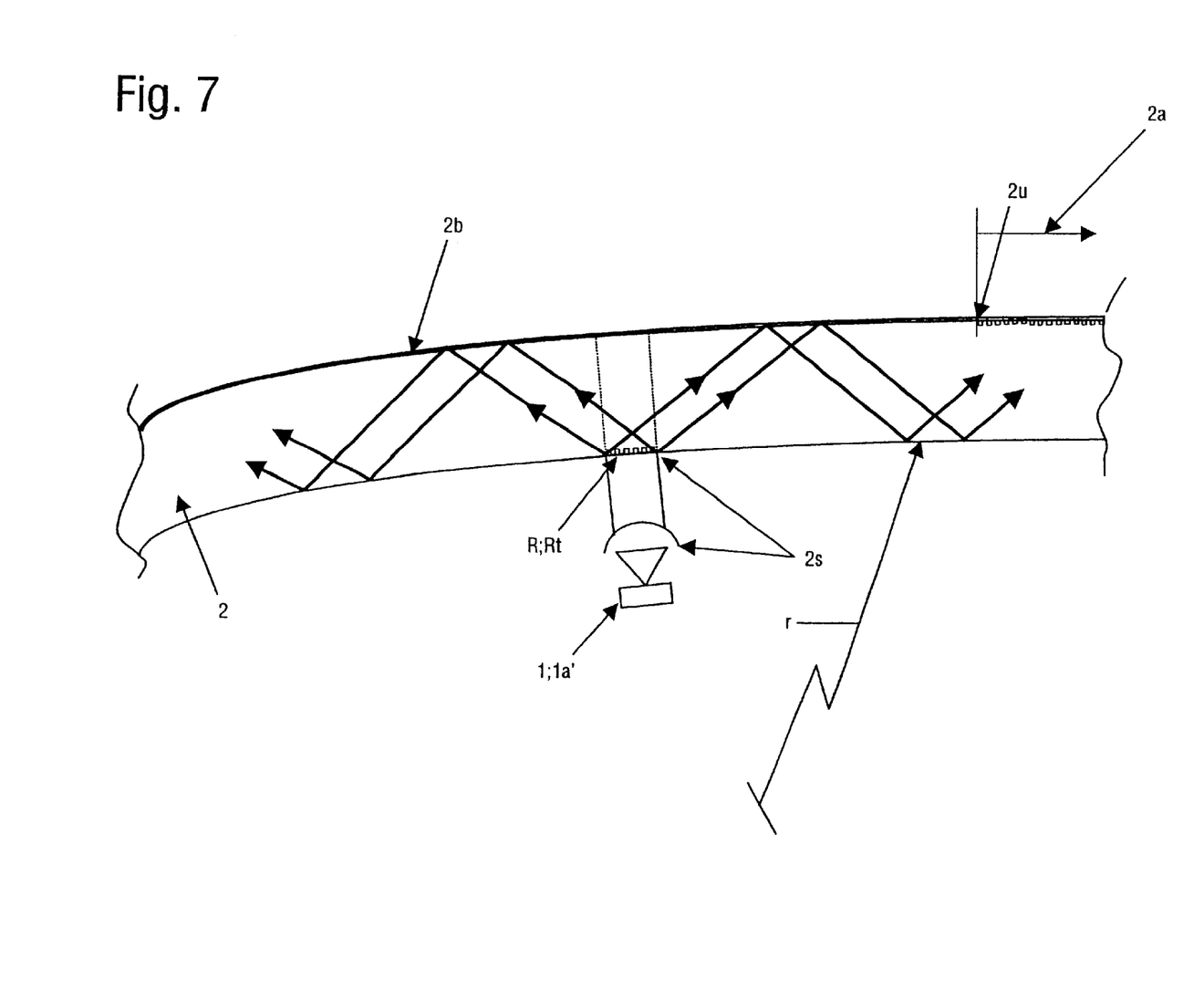
FIG. 7 shows a light panel of the invention in a columnar waveguide embodiment.

In a further preferred embodiment as shown e.g. in FIG. 7, the light panel is configured as a closed box-type structure, such as a lighting column, which is provided with an incoupling system 2s by using a beam distributor or the like present at a front or back surface Rt of the panel element 2 for focusing the light emitted from the light source 1 to propagate with total reflection within the panel element 2.

Figure 2A:
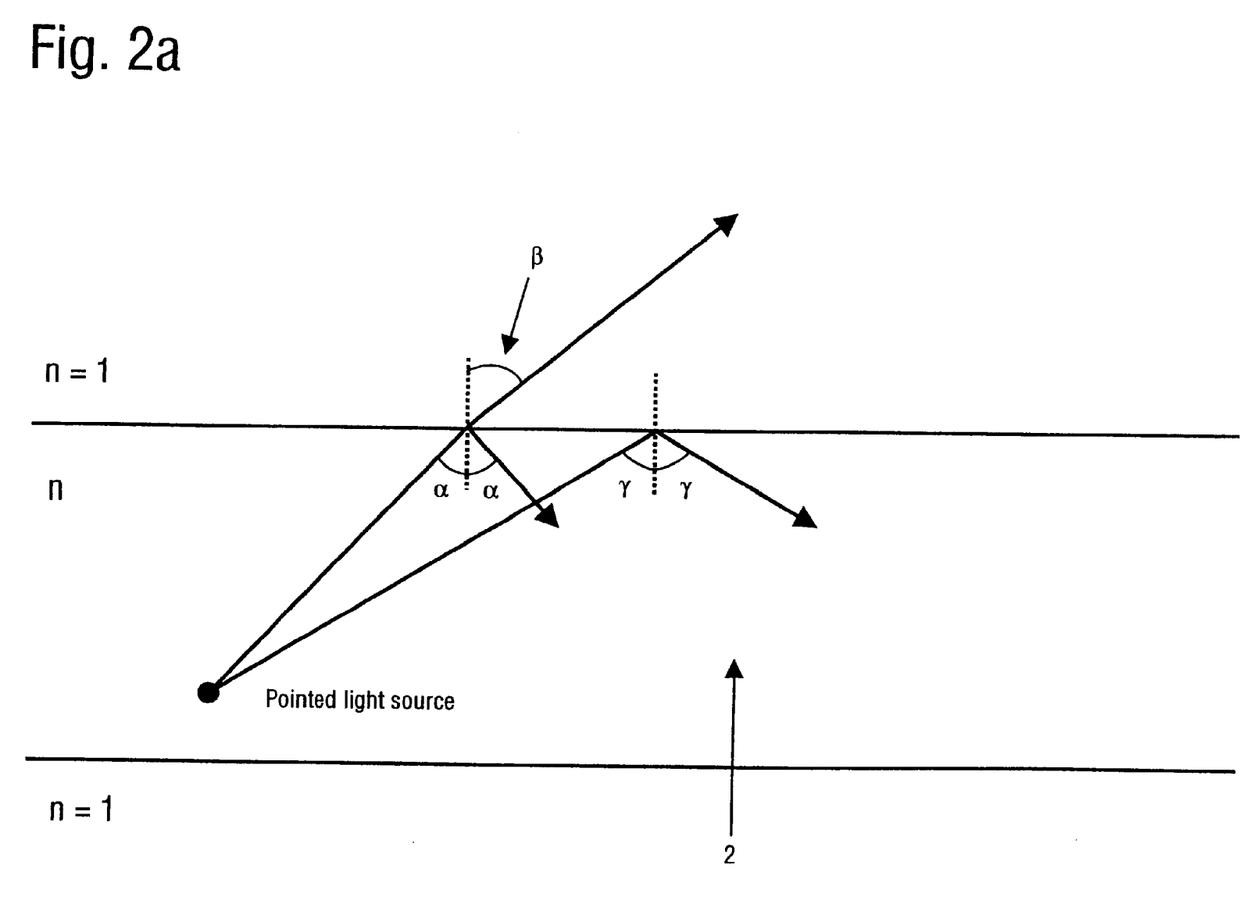
FIGS. 2a, 2b, and 3 illustrate certain principles in relation to total reflection.

Generally speaking, it should be noted about the theory concerning total reflection, in reference to FIG. 2a depicting a waveguide panel 2, having a refractive index n which exceeds the refractive index of air n=1, that the beam emerging from a spot source will be subjected to total reflection, provided that its angle of incidence to a boundary surface, γ, fulfils the condition $\sin \gamma > 1/n$. If the angle of incidence is smaller than this, e.g. $\alpha < \arcsin (1/n)$, the portion of energy expressed by Fresnel patterns shall penetrate a boundary surface. If the medium is other than air, the refractive index 1 in the preceding expressions is replaced with the refractive index of this particular medium.

FIG. 1c, in particular, depicts a solution, wherein at least a locally periodic structure or a diffraction grating, functioning as an outcoupling system 2u, is arranged on the bottom surface of a panel element 2 functioning as a waveguide. The diffraction grating divides an incident plane wave, having an angle of incidence γ, into a set of diffraction orders appearing both inside and outside the waveguide panel. The propagation directions thereof are determined by a grating equation and the diffraction efficiencies (that portion of incident light which ends up in a relevant order) are determined on the basis of the period and shape of a grating profile. The condition shown in FIG. 1c is such that outside the waveguide appear a plurality of transmitted beams, the grating surface 2u being shown illuminated from a plurality of discrete directions. In practice, however, it shows illuminated over a wide angular range, since the waveguide contains a plurality of propagating plane waves which hit the surface in a continuum of various angles γ. An exact electromagnetic diffraction theory can also be used for designing surface profiles producing quite a large number of orders, having a desired distribution of diffraction efficiencies.

Thus, by an appropriate selection of surface profile parameters, it is possible to reach the very condition shown in FIG. 1c, wherein the reflected orders become dominated and the grating surface 2u is shown illuminated when viewed through the waveguide panel 2. This is a way of avoiding especially mechanical damage to the grating surface, although it can naturally be also protected with a certain type of protective layer as it is placed on the top surface of the panel element 2. Moreover, according to the embodiment shown in FIG. 1c, it is desirable to provide a so-called diffuser 3 on the back surface of the panel element 2 functioning as a waveguide panel for widening and equalizing the angular distribution of diffracted radiation, as well as for re-directing the beams set off in a wrong direction back to and through the panel.

Figure 2B:
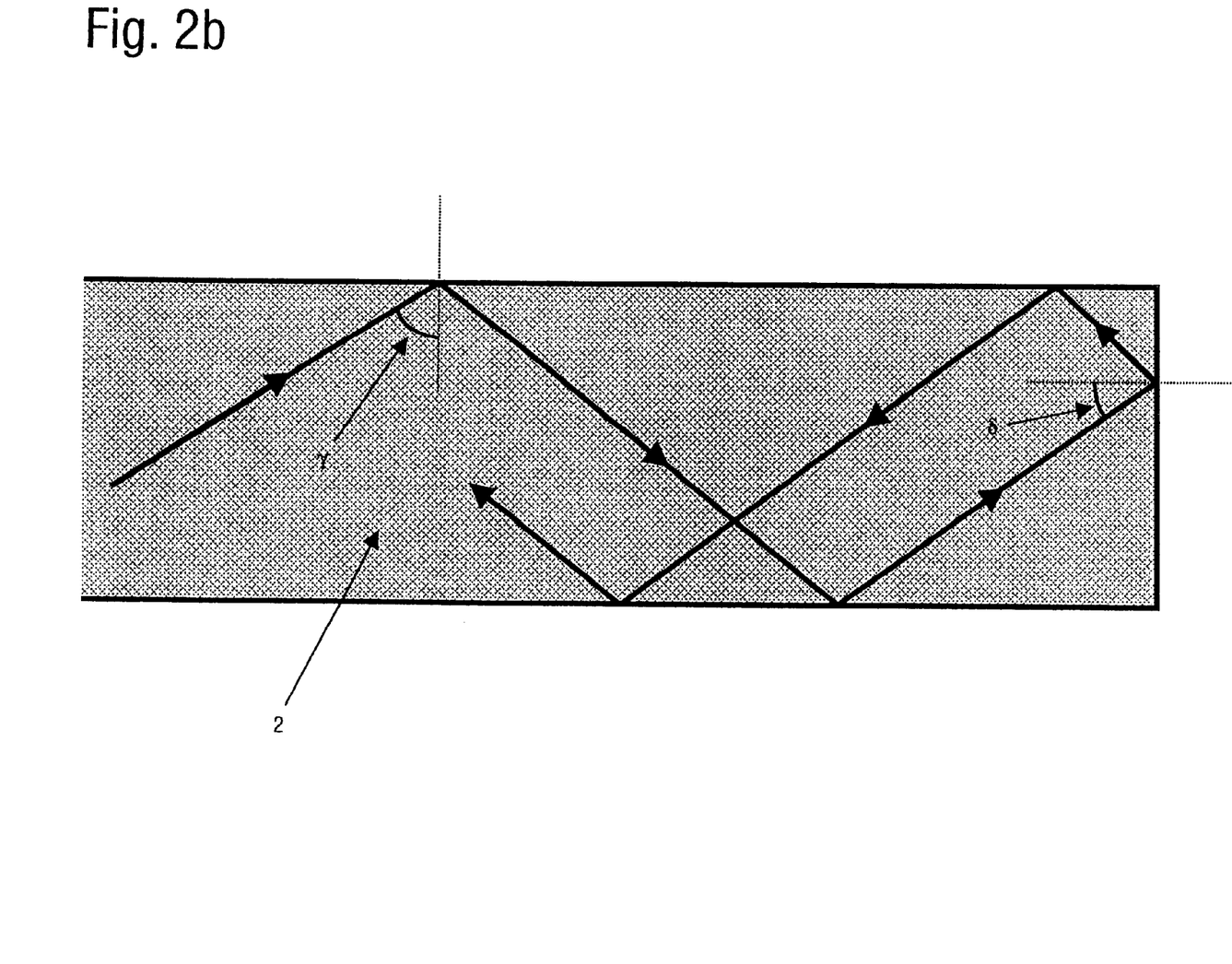
Figure 3:
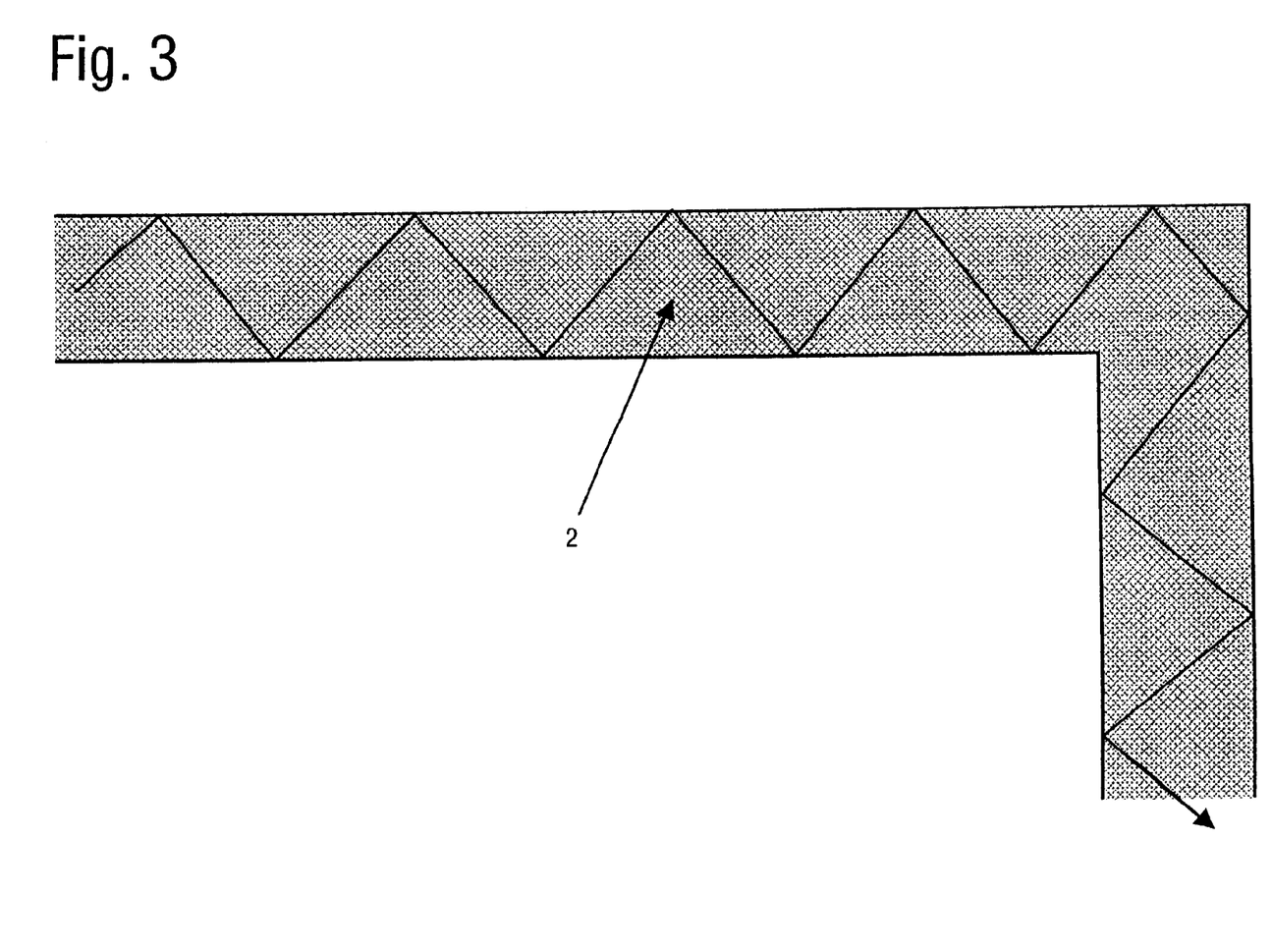

Another significant feature of the invention lies in the fact that light is kept by means of total reflection for as long as possible within the panel element 2 functioning as a waveguide. This is possible when the light to be incoupled in a waveguide propagates within the same quite close to the threshold angle of total reflection, whereby its total reflection occurs, on the principle depicted in FIG. 2b, also from the end walls and propagates through the structure a number of times before diffracting by way of the outcoupling gratings 2u. In places with no outcoupling grating, there is in principle no losses, either, whereby essentially all the light, which has been in coupled, emerges from desired illuminated areas with the exception of absorption taking place in the material. In a further reference to FIG. 3, it is hence possible, if necessary, to bend and/or form a waveguide panel as long as the local radius of curvature is everywhere so small that the limit or threshold angle of total reflection is not fallen short of. As depicted in the figure, it is obvious that a plane waveguide may include 90° angles without violating the principle of total reflection.

Figure 4:
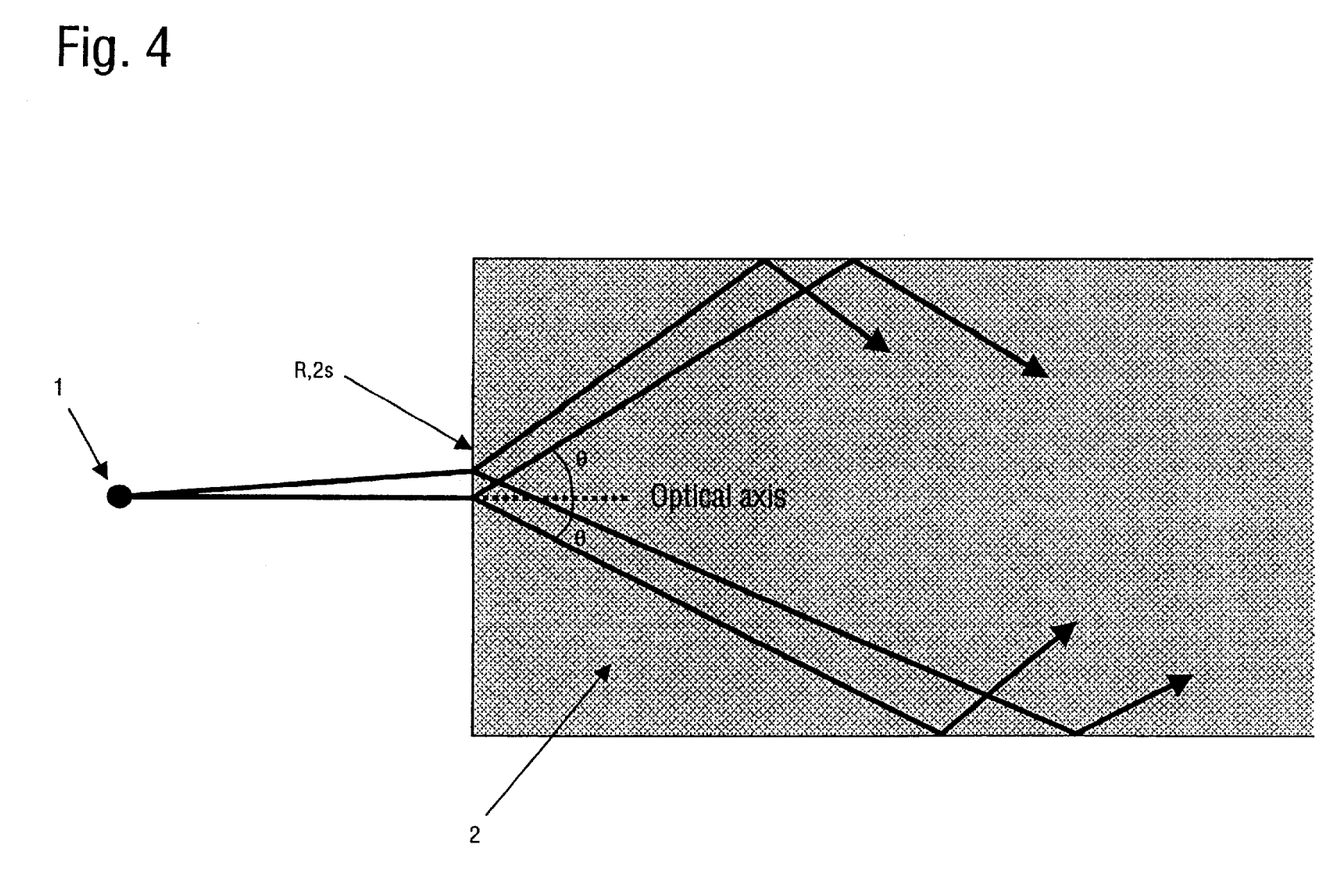
FIGS. 4, 5, 6a, and 6b illustrate certain general principles for an incoupling system associated with a light panel of the invention.
Figure 5:
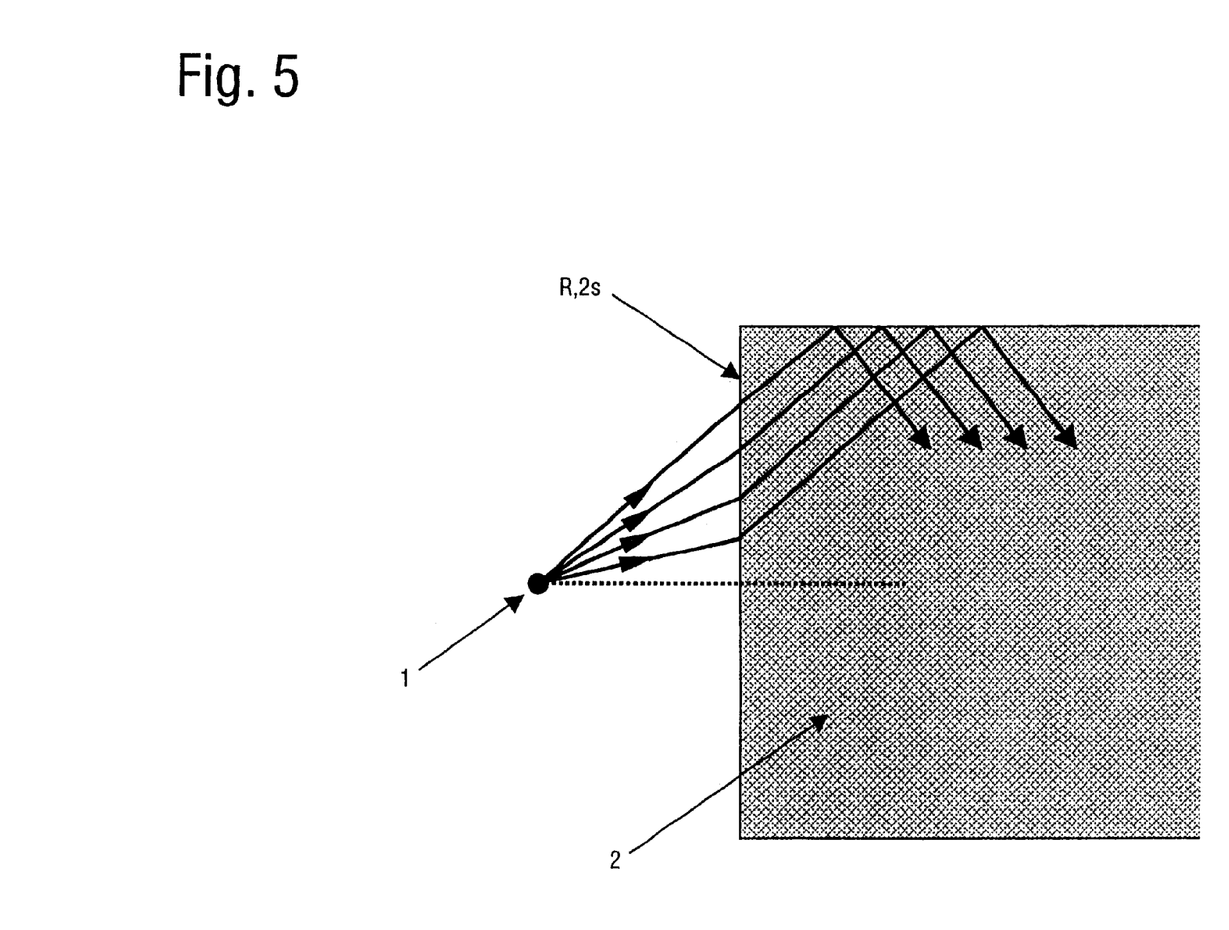

FIG. 4 further illustrates the way a diffractive element bent on a cylindrical surface operates in the plane of a beam propagating to an arbitrary angle θ. Since it is desirable to have all beams propagate with total reflection, it is most preferable to use in the proximity of an optical axis a binary beam distributor, having its period varying as a function of place. This is also a way of providing a manageable number of slightly divergent propagating beams. Further away from the optical axis, it is not possible to force both beams produced by the beam distributor (grating orders +1 and −1) to perform total reflection, and thus it preferable that a locally linear grating structure be used for a desired deviation, as shown in FIG. 5. Here, all beams are quasi-collimated to propagate in a common direction, such that the condition for total reflection is fulfilled for all of those. That requires the modulation of a local grating period at a diffractive incoupling surface as a function of place, and continuous surface profiles for achieving a high diffraction efficiency. The beam distributor means in the middle of an element can be created by a binary structure or the like.

Furthermore, in reference to the embodiment shown in FIG. 7, the light panel is designed as a closed box-type structure or, in this case, as a tubular "lamp post". Thus, it is preferred that the incoupling for a waveguide 2 be implemented by using e.g. beam distributor gratings 2s and by positioning a led/LEDs 1a' either inside or outside the tube. Thus, illuminators to be mounted on a variety of columns can be illuminated in quite a simple and effective fashion.

It is obvious that the invention is not limited to the embodiments described and illustrated above, but it can be modified quite liberally within the scope of the basic concept of the invention. First of all, the filling factor of a diffractive outcoupling system, such as e.g. a local grating, can be used for contributing e.g. to a uniform light outcoupling as the diffraction efficiency is determined on the basis of a grating profile and shape, and to the angles of light outcoupling as the propagation directions and angles of light are determined by a grating equation. The optimal filling factor in each situation is calculable exactly with the aid of a computer. The diffractive out- or incoupling system, such as diffractive structures or gratings, can be constituted by using not only divergent recesses and grooves of pixel structures but also binary pixels, whereby there is a distinctly perceivable ridge (top corner), a bottom, as well as a recess/groove, having its length modifiable from dot to infinity. Such structures can be continuous profiles/contours, which may vary liberally in terms of shape and size. Furthermore, the light source may be constituted not only by discrete light means but also by a solution fully integrated in a panel element functioning as a waveguide. It is naturally obvious that the material for a panel element for use as a waveguide may comprise a most varying range of transparent materials, including glass. The waveguide system of the invention enables the manufacture of e.g. display panels with seven or more segments.

What is claimed is:

1. A light panel, comprising:
at least one light source;
a panel element operatively connected to the at least one light source, the panel element comprising a substantially transparent light transmitting material; and
a diffractive outcoupling system arranged over at least a portion of a light surface of the panel element, the diffractive outcoupling system comprising a plurality of local grating elements, each of the plurality of local grating elements having a diffraction efficiency and comprising at least one pattern of at least one of grooves and recesses, the diffraction efficiency of the local grating elements varies over the outcoupling system as a function of location by varying at least one of filling factor, shape, profile, size, and orientation of the at least one of grooves and recesses over the diffractive outcoupling system.

2. The light panel according to claim 1, further comprising:
a diffractive incoupling system operative to introduce light beams from the light source into the panel element.

3. The light panel according to claim 2, wherein the diffractive incoupling system comprises at least one of a binary beam distributor, a local grating structure, and a diffuser.

4. The light panel according to claim 2, wherein the diffractive incoupling system is arranged at a boundary surface of the panel element.

5. The light panel according to claim 2, wherein the diffractive incoupling system incouples light by means of geometrical contours of the boundary surface.

6. The light panel according to claim 2, wherein the incoupling system is arranged at a perimeter of the panel element.

7. The light panel according to claim 1, wherein the local grating elements comprise at least one of multi-shaped pixels, binary pixels, multi-shaped units and binary units.

8. The light panel according to claim 1, wherein the light source comprises at least one longitudinally successive LED operative to activate the panel element by transmitting light beams therein.

9. The light panel according to claim 1, wherein the panel element comprises a thin and optically clear material having a thickness of 0.1–4 mm.

10. The light panel according to claim 1, wherein the panel element comprises a polymeric, elastomeric, or ceramic sheet or film.

11. The light panel according to claim 1, wherein the panel element comprises at least one of a flexible and a preformed material.

12. The light panel according to claim 1, wherein the light surface of the panel element is adapted to activate by maintaining the entire panel element at a local radius of curvature that is sufficiently small, such that a threshold angle of total reflection is not exceeded as a light beam travels within the panel element.

13. The light panel according to claim 1, wherein the diffractive outcoupling system is configured such that the panel element comprises a different color in one or more sections thereof.

14. The light panel according to claim 13, wherein the different color is provided by one or more independently controlled lighting units producing light of various colors.

15. The light panel according to claim 13, wherein the different color is provided by varying at least one of an intensity and a supply voltage of the light source.

16. The light panel according to claim 1, wherein the panel element comprises a responsive surface operative to carry out at least one of eliminating light beams transmitted from the outcoupling system and preventing formation of pronounced light spots.

17. The light panel according to claim 16, wherein the responsive surface comprises at least one of a reflector and a diffuser.

18. The light panel according to claim 1, wherein the panel element is configured as a closed box-type structure, wherein the incoupling system comprises a beam distributor arranged at a front surface or a back surface of the panel element, and wherein the beam distributor is operative to focus light beams delivered from the light source to propagate with total reflection within the panel element.

19. The light panel according to claim 1, wherein the at least one panel element is operative as a waveguide panel inside which light beams received from the light source propagate with total reflection.

20. The light panel according to claim 1, wherein the a diffractive outcoupling system is operative to outcouple the light beams from inside the panel element.

21. The light panel according to claim 1, wherein the diffraction efficiency of each local grating element varies over the outcoupling system by varying at least one of filling factor, shape, profile, size, and orientation of the at least one of grooves and recesses within each local grating element.

22. The light panel according to claim 1, wherein discontinuities exist in the at least one of grooves and recesses among at least a portion of the local grating elements.

23. The light panel according to claim 1, wherein the outcoupling system uniformly outcouples light over its surface.

24. The light panel according to claim 1, wherein at least a portion of the local grating elements vary in at least one of size and shape.

* * * * *